United States Patent [19]

Hasegawa

[11] Patent Number: 4,956,743

[45] Date of Patent: Sep. 11, 1990

[54] GROUND FAULT INTERRUPTERS FOR GLASSY METAL ALLOYS

[75] Inventor: Ryusuke Hasegawa, Morristown, N.J.

[73] Assignee: Allied-Signal Inc., Morris Township, Morris County, N.J.

[21] Appl. No.: 465,658

[22] Filed: Jan. 19, 1990

Related U.S. Application Data

[63] Continuation of Ser. No. 323,120, Mar. 13, 1989, abandoned, which is a continuation of Ser. No. 180,663, Mar. 30, 1988, abandoned, which is a continuation of Ser. No. 817,208, Jan. 8, 1986, abandoned.

[51] Int. Cl.$^5$ ............................................. H02H 3/16
[52] U.S. Cl. ........................................ 361/45; 361/42; 361/44; 340/650
[58] Field of Search ................................. 361/42–50, 361/91, 92; 340/650

[56] References Cited

U.S. PATENT DOCUMENTS

| | | | |
|---|---|---|---|
| 3,158,785 | 11/1964 | Gagniere et al. | 361/47 |
| 3,856,513 | 12/1974 | Chen et al. | 75/122 |
| 4,152,144 | 5/1979 | Hasegawa et al. | 148/403 X |
| 4,249,969 | 2/1981 | De Cristofaro et al. | 148/121 X |
| 4,366,520 | 12/1982 | Finke et al. | 361/45 |

OTHER PUBLICATIONS

G. B. Finke et al., IEEE Trans. Mag., MAG-17, p. 3157 (1981).
F. Pfeifer et al., IEEE Trans. Mag., MAG-18, p. 1406 (1982).

Primary Examiner—Todd E. Deboer
Attorney, Agent, or Firm—Gus T. Hampilos

[57] ABSTRACT

A ground fault interrupter is adapted to be connected to a circuit having a supply current and a return current. The interrupter has a detection mechanism, including one or more than one cores, for detecting one or more than one ground fault currents. The core is composed of a metal alloy which is at least about 90 percent glassy and which consists essentially of a composition having the formula $Co_aFe_bNi_cM_dB_eSi_f$ where M is at least one selected from a group consisting of Cr, Mo, Mn and Nb, the quantity a, b, c, d, e and f are in atom percent and the sum (a+b+c+d+e+f) is equal to 100 where "a" ranges from about 66 to 71, "b" ranges from about 2.5 to 4.5, "c" ranges from about 0 to 3, "d" ranges from about 0 to 2 except when M=Mn in which case "d" ranges from about 0 to 4, "e" ranges from about 6 to 24 and "f" ranges from about 0 to 19, with the proviso that the sum of "a", "b" and "c" ranges from about 72 to 76 and the sum of "e" and "f" ranges from about 25 to 27, said alloy having the form of a ribbon and having been heat-treated to induce Perminvar-like characteristics thereof. An interruption mechanism operates in response to a signal or more than one signals from the detecting mechanism to interrupt the supply current or currents.

20 Claims, 4 Drawing Sheets

GROUND FAULT INTERRUPTERS FOR GLASSY METAL ALLOYS

This application is a continuation of application Ser. No. 323,120 filed Mar. 13, 1989 which is a continuation of Ser. No. 180,663 filed Mar. 30, 1988 which is a continuation of Ser. No. 817,208, all abandoned.

FIELD OF THE INVENTION

This patent relates to ground fault interrupters and the like made from glassy metal alloys having capability of accurate leakage current detection.

DESCRIPTION OF THE PRIOR ART

Magnetic cores suited for use in ground fault interrupters are disclosed in G. B. Finke, et al., IEEE Trans. Mag., MAG-17, 3157 (1981) and in F. Pfeifer, et al., IEEE Trans. Mag., MAG-18, 1406 (1982). These disclosures teach the use of magnetic materials such as Fe-3 wt % Si and Fe-Ni base materials, e.g., Ni-47 wt % Fe, Ni-52 wt % Fe, and Supermalloy. The Pfeifer, et al. publication teaches that amorphous magnetic materials are useful in cores of switch mode power supplies. However, each of the magnetic materials disclosed therein for use in ground fault interrupters is crystalline.

A differential transformer core for a ground fault interrupter is disclosed in U.S. Pat. No. 4,366,520. The core is wound with a plurality of interleaved layers of magnetizable material, all of the layers having high permeability and being of similar low coercivity. The resulting core has a rounded B-H hysteresis loop which is inclined in relation to the B axis. In addition, the patent discloses a ground fault interrupter comprising such a core. The magnetizable material to be used in the core is supermalloy or glassy magnetic material of the Fe-B type and others. However, these Fe-B type alloys exhibit thermal stability too low to permit operation of ground fault interrupters at elevated temperatures (i.e. about 80°–100° C.) for a prolonged period of time.

As is known, metallic glasses are metastable materials lacking any long range order. X-ray diffraction scans of glassy metal alloys show only a diffuse halo similar to that observed for inorganic oxide glasses.

Metallic glasses (amorphous metal alloys) have been disclosed in U.S. Pat. No. 3,856,513, issued Dec. 24, 1974 to H. S. Chen et al. These alloys include compositions having the formula $M_aY_bZ_c$, where M is a metal selected from the group consisting of iron, nickel, cobalt, vanadium and chromium, Y is an element selected from the group consisting of phosphorus, boron and carbon and Z is an element selected from the group consisting of aluminum, silicon, tin, germanium, indium, antimony and beryllium, "a" ranges from about 60 to 90 atom percent, "b" ranges from about 10 to 30 atom percent and "c" ranges from about 0.1 to 15 atom percent. Also disclosed are metallic glass wires having the formula $T_iX_j$, where T is at least one transition metal and X is an element selected from the group consisting of phosphorus, boron, carbon aluminum, silicon, tin, germanium, indium, beryllium and antimony, "i" ranges from about 70 to 87 atom percent and "j" ranges from 13 to 30 atom percent. Such materials are conveniently prepared by rapid quenching from the melt using processing techniques that are new well-known in the art.

Use of a number of Fe-base glassy alloys in ground fault interrupters is disclosed in co-pending patent applications by R. Hasegawa et al. (Ser. No. 594,507) and G. E. Fish et al. (Ser. No. 735,510). These materials are characterized by low coercivity, i.e. less than 8 A/m, high squareness ratio defined as the remanent to saturation induction, of at least 0.85 and high magnetic permeability, i.e. at least 250,000 at 60 Hz. The high magnetic permeability renders the devices made from such materials very sensitive. However, the sensitivity sometimes becomes so excessive that even a fraction of the field to be detected triggers the relay circuit of the ground fault interrupter. This kind of false detection is not desirable. What is desirable is a device which is set to a predetermined threshold field beyond which the device operates effectively without fail. Also desirable is a device which has multiple threshold field detection capability. The present patent relates to these kinds of devices.

SUMMARY OF THE INVENTION

The present invention provides a ground fault interrupter that is small, light, economical to construct and highly reliable in operation. The reliability of the operation includes virtually no false operation and detection of multiple levels of magnetic fields. Generally stated, the ground fault interrupter has a core comprised of a metal alloy which is at least about 90% glassy consisting essentially of a composition having the formula $Co_aFe_bNi_cM_dB_eSi_f$ where M is at least one member selected from the group consisting of Cr, Mo, Mn and Nb, a-f are in atom percent and the sum $(a+b+c+d+e+f)$ is equal to 100 where "a" ranges from about 66 to 71, "b" ranges from about 2.5 to 4.5, "c" ranges from about 0 to 3, "d" ranges from about 0 to 2 except when M=Mn in which case "d" ranges from about 0 to 4, "e" ranges from about 6 to 24 and "f" ranges from about 0 to 19, with the proviso that the sum of "a", "b" and "c" ranges from about 72 to 76 and the sum of "e" and "f" ranges from about 25 to 27. The alloys of which the ground fault interrupter core is comprised are at least about 90% glassy, preferably at least about 95% glassy and most preferably about 100% glassy as determined by x-ray diffraction and transmission electron microscopy. The alloys are fabricated by a known process which comprises forming a melt of the desired composition and quenching at a rate of at least about $10^{6°}$ C./sec by casting molten alloy on a rapidly moving chill substrate such as a rotating wheel.

The glassy alloy is heat-treated between about 50° and 110° C. below its first crystallization temperature for a period between about 15 and 180 minutes and subsequently cooled at a rate slower than about $-60°$ C./min. When thus annealed, the alloys of the ground fault interrupter core have Perminvar-like characteristics, i.e. relatively constant permeabilities at low exciting magnetic field levels and constricted hysteresis loops. Because of the constricted nature of the hysteresis loops, the effective permeabilities above certain threshold fields are much higher than at fields below the threshold values. In addition, these materials have low dc coercivities of less than about 12 A/m and saturation induction levels ranging from about 0.5 T to about 1 T, Curie temperature ranging from about 200° to 450° C. and the first crystallization temperature ranging from about 440° to 570° C. These features render the glassy alloys of the present invention particularly suited for use in cores of ground fault interrupters having high precision and versatility.

BRIEF DESCRIPTION OF THE DRAWING

The invention will be more fully understood and further advantages will become apparent when reference is made to the following detailed description and the accompanying drawings, in which.

DETAILED DESCRIPTION OF THE INVENTION

Figure 1:
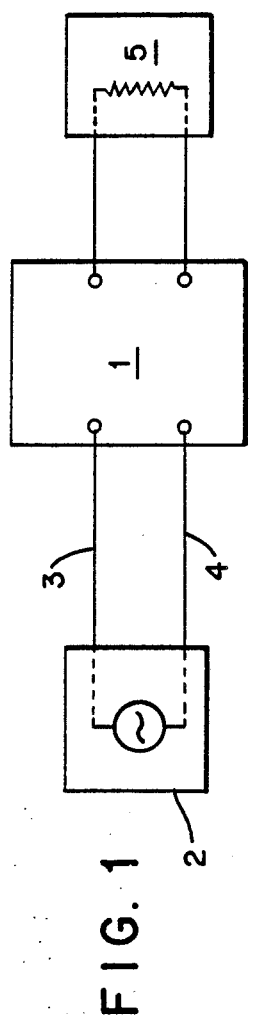
FIG. 1 is a schematic circuit diagram depicting a ground fault interrupter of the invention operably associated with a circuit supplying power to an electrical device.
Figure 2:
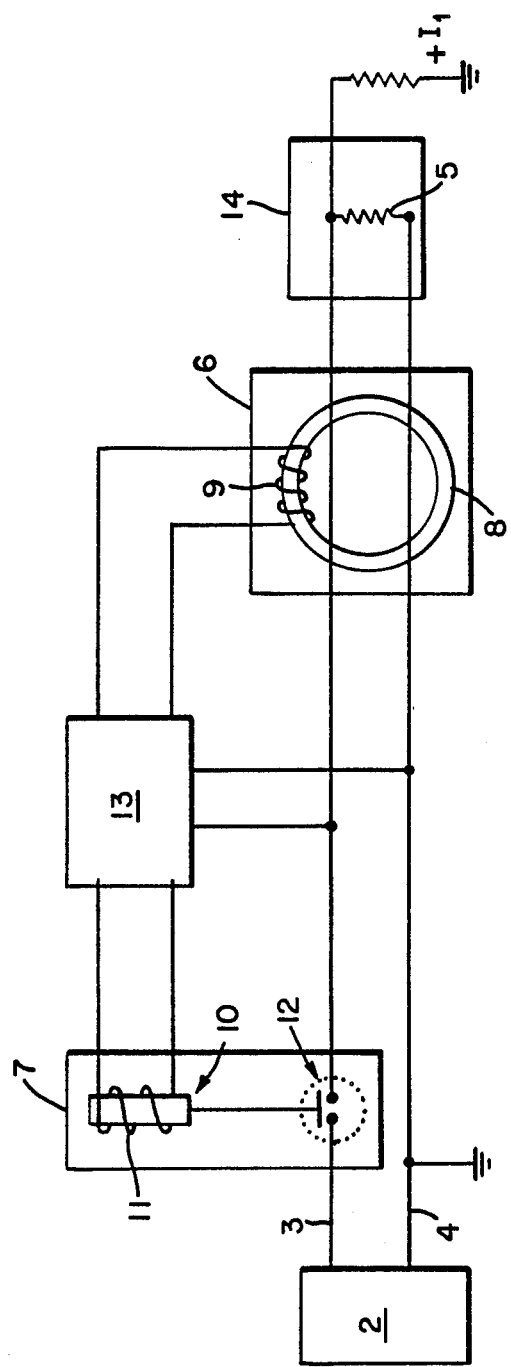
FIG. 2 is a schematic circuit diagram in more detail the ground fault interrupter shown in FIG. 1.

Referring to the drawing, there is illustrated one form of a ground fault interrupter incorporating the elements of the present invention. Other forms of the ground fault interrupter can also be used. The ground fault interrupter, shown generally at 1 in the drawing FIG. 1, should therefore be interpreted as illustrative and not in a limiting sense. As illustrated in FIG. 1, the ground fault interrupter 1 is connected to a circuit 2 having a supply current 3 and a return current 4, and a load 5. Ground fault interrupter 1 comprises a detection means 6 and an interruption means 7, as shown in FIG. 2.

Detection means 6 has a core 8 composed of a metal alloy which is at least about 90% glassy and consists essentially of a composition having the formula $CoFe_aNi_bM_cSi$ where M is at least one selected from the group consisting of Cr, Mo, Mn and Nb, a-f are in atom percent and the sum $(a+b+c+d+e+f)$ is equal to 100, where "a" ranges from about 66 to 71, "b" ranges from about 2.5 to 4.5, "c" ranges from about 0 to 3, "d" ranges from about 0 to 2 except when M=Mn in which case "d" ranges from about 0 to 4, "e" ranges from about 6 to about 24 and "f" ranges from about 0 to 19, with the proviso that the sum of "a", "b" and "c" ranges from about 72 to 76 and the sum of "e" and "f" ranges from about 25 to 27. The alloys of which the ground fault interrupter core is comprised are at least about 90% glassy, preferably at least 95% glassy and most preferably about 100% glassy as determined by x-ray diffraction and transmission electron microscopy. The purity of the above composition is that found in normal commercial practice. However, it would be appreciated that the metal M in the alloys of the invention may be replaced by at least one other element such as vanadium, tungsten, tantalum, titanium, zirconium and hafnium, and up to about 4 atom percent of Si may be replaced by carbon, aluminum or germanium without significantly degrading the desirable magnetic properties of these alloys. The alloy of which core 8 is composed preferably has the form of a ribbon that has been heat-treated to induce Perminvar-like characteristics thereof.

When heat-treated, as described hereinafter in further detail, the alloys of the ground fault interrupter core 8 have a superior combination of permeabilities at line frequencies (e.g. f=60 Hz) ranging from about 500 to 40,000 for near-zero applied fields, permeabilities ranging from about 3,500 to 200,000 above certain threshold fields ranging from about 0.2 to 26 A/m and high degrees of thermal stability as evidenced by high crystallization temperatures exceeding about 440° C.

The detection means 6 additionally comprises a secondary winding 9 composed of a plurality of turns of conductive wire, such as copper, aluminum or the like, about core 8. Interruption means 7 comprises a relay 10 having relay coil 11 adapted to actuate contacts 12 to open and close the circuit containing a load 5. An amplifier 13 connected in series with and between secondary windings 9 and coil 11 can, optionally, be used to increase the current signal to, and hence the sensitivity of, interruption means 7. The interruption means 7 operates in response to a signal from detection means 6 to interrupt supply current 3 from power source 2 to load 5 of electrical device 14, thereby minimizing danger, such as electrical shock or excessive heat build-up, resulting from electrical malfunction of device 14. In this detection/interruption system, the leakage current $I_1$ to be detected can be preset by choosing a core 8 having a corresponding threshold field.

Figure 3:
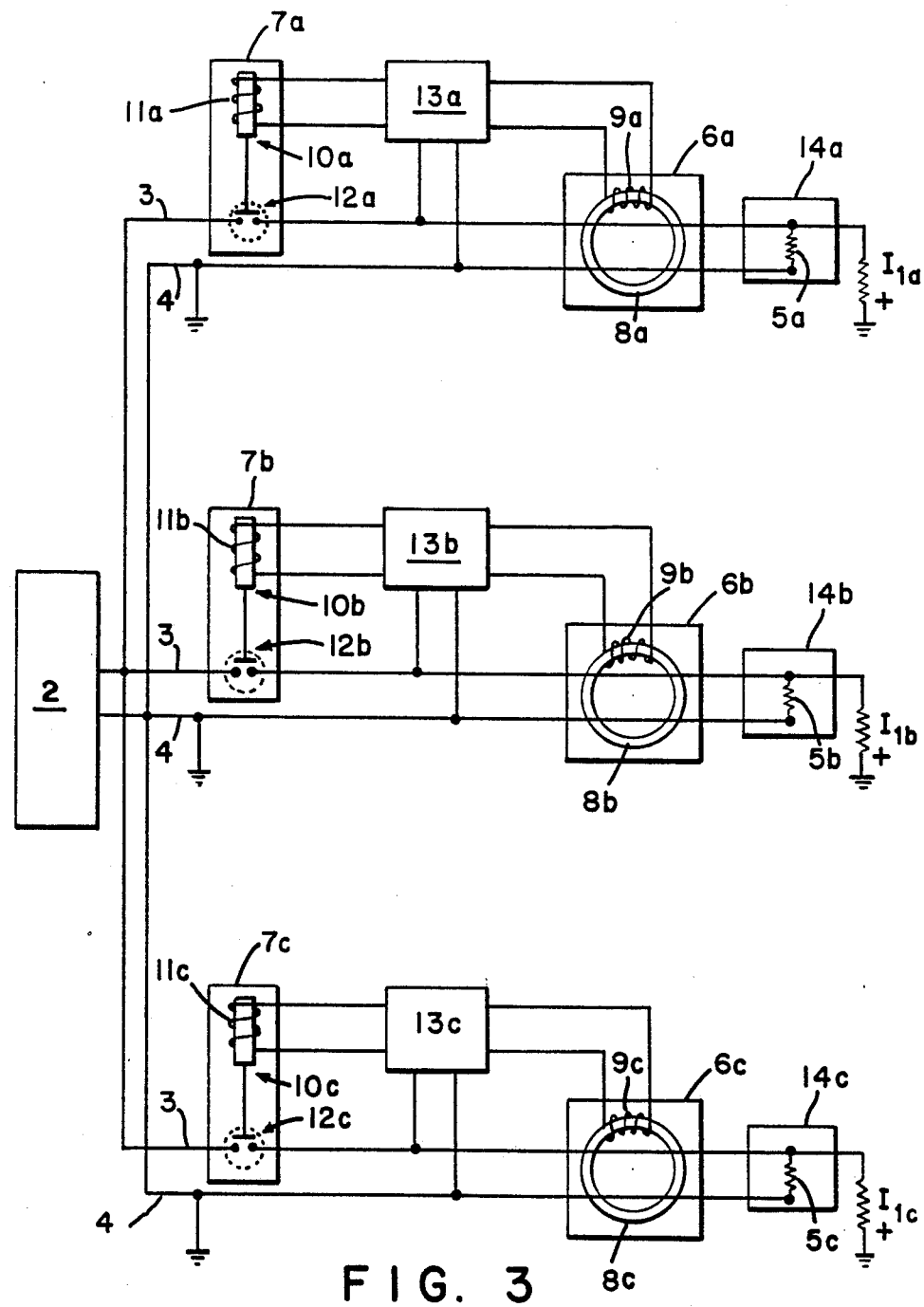
FIG. 3 is a schematic circuit diagram of an alternative embodiment of the invention wherein a plurality of ground fault interrupters are employed.

By utilizing a plurality of core 8a, 8b, 8c etc. having different threshold fields, a multiple leakage current detection/interruption system is realized as shown in the FIG. 3. In this embodiment of the invention, the detection means 6a, 6b, 6c etc. additionally comprise respectively secondary windings 9a, 9b, 9c etc. composed of a plurality of turns of conductive wire such as copper, aluminum or the like, about the cores 8a, 8b, 8c etc. respectively. Interruption means 7a, 7b, 7c etc. comprise relays 10a, 10b, 10c etc. having relay coils 11a, 11b, 11c etc. respectively adapted to actuate contacts 12a, 12b, 12c etc. to open or close circuits containing loads 5a, 5b, etc., respectively. Amplifiers 13a, 13b, 13c connected in series with and between secondary windings 9a, 9b, 9c etc. and coils 11a, 11b, 11c, etc. can, optionally, be used to increase the current signals to, and hence the sensitivities of, interruption means 7a, 7b, 7c etc. The interruption means 7a, 7b, 7c, etc. operate in response to signals from detection means 6a, 6b, 6c, etc. to interrupt supply currents 3a, 3b, 3c, etc. from power source 2 to loads 5a, 5b, 5c, etc. of electrical devices 14a, 14b, 14c, etc., thereby minimizing danger, such as electrical shock or excessive heat build-up, resulting from electrical malfunction of devices 14a, 14b, 14c, etc. The advantage of the present system is to disrupt current supply or supplies of only the malfunctional device or devices without interrupting current supplies to other non-malfunctional devices.

Magnetic cores used in the ground fault interrupters of the invention are preferably fabricated by first forming from metallic glass a core having the desired final shape (e.g., a toroid, rod or the like) and then subjecting the core to the appropriate heat-treatment described herein. During the heat-treatment, magnetic fields are usually not needed. The magnetic fields are, optionally, applied in the longitudinal or transverse directions, defined, respectively, as the direction along which the core is magnetically excited during operation and the direction perpendicular to that of magnetic excitation during operation. The core can be formed from a plurality of annular rings punched or etched from a metallic glass ribbon. Most preferably, the core is a wound toroid in which a continuous ribbon of metallic glass is wound upon itself or upon a supporting bobbin. For such a core, the longitudinal direction is the circumferential direction in which the ribbon is wound and the transverse direction is parallel to the axis of the toroid.

A longitudinal magnetic field ($H_{11}$) is conveniently applied to a toroid either by passing a suitable electric current through a set of toroidally wound windings or by passing a suitable current through at least one conductor directed through the center of, and parallel to the axis of, the toroid. A transverse magnetic field (H) is conveniently applied by placing the toroid coaxially between the poles either of permanent magnets or of an electromagnet or by placing the toroid coaxially inside a solenoid energized by a suitable electric current.

The first preferred method of the heat-treatment is to heat the core of the invention to a temperature between about 50° and 110° C. below the first crystallization of the material and hold it for a period between about 15 and 180 minutes followed by cooling the core at a rate slower than about −60° C./min to room temperature. A particular choice of the combination of the heat-treatment temperature ($T_a$) and holding time ($t_a$) results in a certain Perminvar-like property with a certain constant permeability for low magnetic field excitations below a certain threshold field ($H_s$) and a constricted B-H loop. The difference of the impedance permeability below and above this threshold field is utilized as the signal to activate the relay circuit mentioned above. Such difference often amounts to a value exceeding 100,000 for 60 Hz excitations. With a coercivity at 60 Hz of as low as 0.2 A/m (2.5 mOe) and the variable threshold field, the core of the present invention is most suited for such applications as ground fault interrupters and the like. The variable threshold field renders such devices more versatile.

The preferred method of modifying the magnetic properties of the alloys of the present invention is further characterized by the choice of two different directions of the magnetic field applied during the heat-treatment. The direction is chosen on the basis of the desired final properties.

The second preferred method comprises a heat-treatment in a transverse field, and optionally, in the presence of a mixed magnetic field having a first component applied in the transverse direction and a second component applied in the longitudinal direction. For heat-treatment in the presence of a transverse field, the field strength is typically about 80 to 1600 A/m. For heat-treatment in the presence of a mixed field, the first component has a strength of about 80 to 1600 A/m and the second component has a strength of about 0 to about 80 A/m. The duration and temperature of heat-treatment are chosen as in the first method. The resulting material is characterized by low dc and ac (50–400 Hz) coercivity, low impedance permeability at low magnetic field excitation below a certain threshold field which can be controlled by the strength of the transverse field. The impedance permeability above the threshold field is also varied by the resultant field strength consisting of transverse and longitudinal components of the applied fields. The magnetic cores fabricated with such heat-treated materials are especially suited for ground fault interrupter applications which require multiple steps of current detection/interruption.

The ground fault interrupter of the present invention represents an improvement over conventional ground fault interruption devices, such as those described by U.S. Pat. No. 4,353,103 to Whitlow. Basically, a ground fault interrupter is an electrical protective device which interrupts the flow of electrical supply current to a circuit upon occurrence of a ground fault, i.e., an imbalance between the current flowing from the electrical power distribution system into a load and the current returning to the distribution system from the other side of the load. Such an imbalance is indicative of a ground fault current flowing from some point in the load to ground by an alternate path. Such a leakage current is potentially hazardous, as in the case of a leakage current flowing through the body of the user of a defective appliance. Ground fault interruption means are now required by electrical codes for electrical service in certain hazardous locations, e.g., outlets in garages, bathrooms, and outdoors. Ground fault interrupters are also used to protect against fire in defective electrical equipment.

A ground fault interrupter frequently comprises a differential current transformer with a toroidal magnetic core. The primary of the transformer has separate windings through which the supply current and the return current, respectively, pass. The windings are disposed in such a manner that when the supply and return currents are equal, i.e., no ground fault exists, the magnetic fields produced by the separate windings cancel. When a ground fault occurs the cancellation is no longer exact. The resulting ac magnetic field induces a voltage in a secondary winding which is used to activate means for interrupting the flow of supply current.

In the design of magnetic cores for use in ground fault interrupter, it is an objective to attain a high sensitivity. As such, only one level of leakage current is detected and resultant main current interruption takes place.

Magnetic permeability is the ratio of induction to applied magnetic field. A higher permeability renders a material more useful in certain applications such as ground fault interrupters, due to the increased sensitivity. A particular measure of permeability under ac excitation is impedance permeability, defined to be the ratio of the apparent maximum induction to the apparent maximum magnetic field, as determined for a magnetic core from the root mean square (rms) value of the voltage induced in a set of secondary windings and the rms value of exciting current in a set of primary windings, respectively.

Generally, in a magnetic material, the maximum impedance permeability occurs for excitation by an applied field whose magnitude is on the order of the coercivity $H_c$. Hence, the optimal design for a device such as a ground fault interrupter would include a magnetic core having coercivity of the order of the magnetic field produced by a current equal to the minimum ground fault current to which the device would be expected to respond. Conventional crystalline materials include Fe-3 wt % Si, Fe-50 wt % Ni, and Ni-17 wt % Fe-4 wt % Mo (4-79 Moly permalloy or supermalloy). As tape-wound toroids, these materials have dc coercivities of the order of 40, 8, and 2 A/m respectively. Glassy metal alloys for use in the prior art as disclosed in U.S. patent application, Ser. No. 735,510, by G. E. Fish et al. have coercivities ranging from about 1 to 8 A/m. In contrast, the glassy alloys contemplated for use in this invention have coercivities as low as about 0.2 A/m. Such low coercivities are advantageous because the cores made from such materials can detect very small magnetic fields generated from leakage currents. Low coercivities are important when the threshold fields are low. The most significant difference between prior art core materials and the present cores based on glassy metals for use in ground fault interrupters is that the maximum impedance permeability is obtained near the coercivity in the former while it is obtained slightly above thre threshold field for the latter. This feature renders the cores of the present invention capable of detecting certain preset levels of leakage currents, which is not possible in the cores of the prior art.

It is a prime objective of this invention to provide a ground fault interrupter having a core which can detect a pre-selected level of leakage current, thus enhancing the precise operation of the device. Furthermore, by employing more than one such cores with different levels of detection capabilities, a multistage current interruption system is realized which reduces the frequency of the current supply disruption for the electrical devices without any fault.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLES

Toroidal test samples were prepared by winding approximately 10–30 gram of 10–25 mm wide ribbon of various glassy metal compositions containing cobalt, iron, nickel, boron, silicon, chromium, manganese, molybdenum, niobium, and optionally, carbon and germanium on steatite cores having inside diametal of about 4 cm. Turns of high temperature magnetic wire were wound on some of the toroids to provide a dc longitudinal field for heat-treatment purposes. The samples were heat-treated in vacuum for a period of $t_a$ and at a temperature $T_a$ and subsequently cooled to room temperature at a rate slower than about $-60°$ C./min.

Table I exemplifies some of the typical data taken at 60 Hz

TABLE I

Cores made from glassy $Co_{67.8}Fe_{4.2}Cr_1B_{12}Si_{15}$ ribbons were heat treated at temperature $T_a$ for $t_a = 15$ min. without any applied field and subsequently cooled to room temperature at a rate of about $-5°$ C./min. The impedance permeability near zero applied field, $\mu_o$ (60 Hz), and at the above the threshold field ($H_s$), $\mu_p$ (60 Hz) and coercivity $H_c$ for 60 Hz are listed.

f = 60 Hz

| $T_a$ (°C.) | $H_c$ (A/m) | $H_s$ (A/m) | $\mu_o$ | $\mu_p$ |
|---|---|---|---|---|
| 460 | 0.56 | — | 100,000 | 150,000 |
| 480 | 0.20 | 0.8 | 30,000 | 143,000 |
| 500 | 0.48 | 2.2 | 20,000 | 71,000 |

Figure 4:
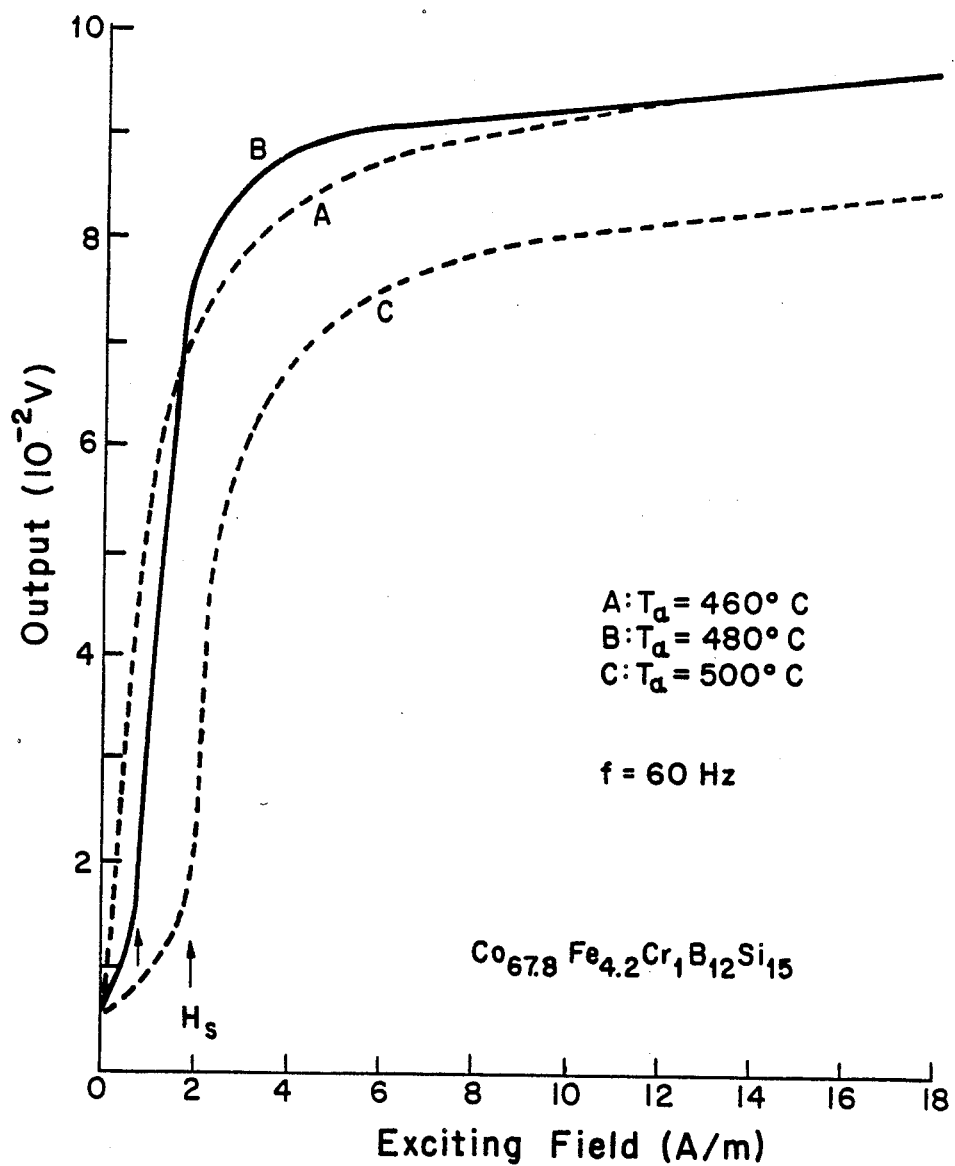
FIG. 4 is a graph depicting typical threshold values at which plural interruption is effected by the embodiment of FIG. 3.

It should be noted in this Table that the difference in the permeability, i.e. $\mu_p - \mu_o$, is the most important factor in the present application. This difference, exceeding about 50,000, is reflected in the output signal of the core which, in turn, activates the relay circuit of a ground fault interrupter. FIG. 4 shows the examples of such output signals obtained from the cores of Table I. The threshold fields of 0.8 and 2.2 A/m mean that these cores can detect current levels of about 10 and 28 mA respectively flowing in a straight wire situated about 2 mm from the toroidal cores which are wound around the current-carrying wire.

Table II lists some of other representative data similar to those of Table I.

TABLE II

Relevant magnetic data taken at 60 Hz for cores of the present invention made from various glassy metal alloys. The definition of the magnetic quantities is the same as that of Table I. Heat-treatment was performed without applied fields unless otherwise mentioned.

| Co | Fe | Ni | M | B | Si | $T_a$ (° C.) |
|---|---|---|---|---|---|---|
| 70.5 | 4.5 | — | — | 24 | Ge = 1[a] | 420 |
| 68.6 | 4.4 | — | Mo = 2 | 21 | Ge = 4[a] | 480 |
| 65.7 | 4.4 | 2.9 | Mo = 2 | 23 | C = 2[a] | 440 |
| 65.7 | 4.4 | 2.9 | Mo = 2 | 23 | 2 | 450 |
| 70.5 | 4.5 | — | — | 15 | 10 | 460 |
| 70.5 | 4.5 | — | — | 15 | 10 | 460 |
| 70.5 | 4.5 | — | — | 15 | 10 | 460 |
| 69.9 | 4.1 | — | Mn = 1 | 8 | 17 | 400 |
| 69.9 | 4.1 | — | Mn = 1 | 8 | 17 | 420 |
| 69.0 | 4.0 | — | Mn = 2 | 8 | 17 | 400 |
| 69.0 | 4.0 | — | Mn = 2 | 8 | 17 | 420 |
| 68.0 | 4.0 | — | Mn = 3 | 8 | 17 | 400 |
| 68.0 | 4.0 | — | Mn = 3 | 8 | 17 | 420 |
| 67.1 | 3.9 | — | Mn = 4 | 8 | 17 | 420 |
| 67.5 | 4.5 | 3.0 | — | 8 | 17 | 380 |
| 67.5 | 4.5 | 3.0 | — | 8 | 17 | 380 |
| 67.5 | 4.5 | 3.0 | — | 8 | 17 | 380 |
| 67.5 | 4.5 | 3.0 | — | 8 | 17 | 380 |
| 69.0 | 4.0 | — | Cr = 2 | 8 | 17 | 440 |
| 69.2 | 3.8 | — | Mo = 2 | 8 | 17 | 460 |
| 69.2 | 3.8 | — | Mo = 2 | 8 | 17 | 460 |
| 69.2 | 3.8 | — | Mo = 2 | 8 | 17 | 460 |
| 69.2 | 3.8 | — | Mo = 2 | 8 | 17 | 460 |
| 69.2 | 3.8 | — | Mo = 2 | 8 | 17 | 460 |
| 68.2 | 3.8 | — | Mn = 1 | 12 | 15 | 480 |
| 67.7 | 3.3 | — | Mn = 2 | 12 | 15 | 500 |
| 67.8 | 4.2 | — | Mo = 1 | 12 | 15 | 500 |
| 67.8 | 4.2 | — | Cr = 1 | 12 | 15 | 480 |
| 67.8 | 4.2 | — | Cr = 1 | 12 | 15 | 500 |
| 67.0 | 4.0 | — | Cr = 2 | 12 | 15 | 480 |
| 69.0 | 3.0 | — | Mn = 3 | 10 | 15 | 420 |
| 69.0 | 3.0 | — | Mn = 3 | 10 | 15 | 440 |
| 69.0 | 3.0 | — | Mn = 3 | 10 | 15 | 460 |
| 68.5 | 2.5 | — | Mn = 4 | 10 | 15 | 440 |
| 68.8 | 4.2 | — | Cr = 2 | 10 | 15 | 440 |
| 68.8 | 4.2 | — | Cr = 2 | 10 | 15 | 460 |
| 69.0 | 4.1 | 1.4 | Mo = 1.5 | 12 | 12 | 430 |
| 69.0 | 4.1 | 1.4 | Mo = 1.5 | 12 | 12 | 420 |
| 69.0 | 4.1 | 1.4 | Mo = 1.5 | 12 | 12 | 460 |

| $T_a$ (min) | $\mu_o$ | $\mu_p$ | $H_s$ (A/m) | $H_p$ (A/m) |
|---|---|---|---|---|
| 15 | 550 | 19,000 | 17 | 26 |
| 15 | 4,500 | 17,000 | 2.1 | 24 |
| 15 | 1,500 | 10,500 | 26 | 36 |
| 15 | 2,000 | 11,500 | 18 | 36 |
| 15[b] | 3,000 | 25,700 | 4 | 12 |
| 15[c] | 1,400 | 12,800 | 9.6 | 24 |
| 15 | 2,000 | 23,000 | 9.2 | 16 |
| 15 | 2,000 | 30,000 | 8.6 | 14 |
| 15 | 2,200 | 19,000 | 10 | 20 |
| 15 | 3,000 | 25,000 | 7.6 | 12 |
| 15 | 3,500 | 29,000 | 7.2 | 12 |
| 15 | 4,000 | 41,010 | 4 | 9.6 |
| 15 | 4,000 | 34,000 | 6 | 11 |
| 15 | 7,500 | 45,000 | 2.7 | 6.8 |
| 15 | 2,300 | 21,000 | 4.8 | 20 |
| 60 | 2,000 | 19,500 | 5.6 | 19 |
| 90 | 2,500 | 20,000 | 6.4 | 18 |
| 105 | 1,500 | 22,500 | 5 | 16 |
| 15 | 14,000 | 64,000 | 2.2 | 6.4 |
| 15 | 5,000 | 25,000 | 6.8 | 16 |
| 30 | 28,000 | 93,000 | 0.48 | 2.4 |
| 45 | 24,000 | 100,000 | 1.2 | 2.4 |
| 90 | 20,000 | 70,000 | 0.36 | 4 |
| 105 | 20,000 | 75,000 | 0.32 | 4 |
| 15 | 14,000 | 76,000 | 2.2 | 4 |
| 15 | 13,000 | 69,000 | 2 | 5.2 |
| 15 | 25,000 | 160,000 | 0.8 | 2 |
| 15 | 24,000 | 124,000 | 0.64 | 2.0 |
| 15 | 20,000 | 66,000 | 2 | 4.4 |
| 15 | 50,000 | 197,000 | ~0.2 | 1.2 |
| 15 | 4,000 | 37,500 | 3.2 | 8 |
| 15 | 5,000 | 36,000 | 3 | 8 |
| 15 | 4,500 | 35,000 | 3.1 | 8 |

TABLE II-continued

Relevant magnetic data taken at 60 Hz for cores of the present invention made from various glassy metal alloys. The definition of the magnetic quantities is the same as that of Table I. Heat-treatment was performed without applied fields unless otherwise mentioned.

| | | | | |
|---|---|---|---|---|
| 15 | 6,500 | 40,000 | 1.4 | 8 |
| 15 | 9,000 | 60,000 | 2 | 5.2 |
| 15 | 10,500 | 55,000 | 2.8 | 6.0 |
| 150 | 2,000 | 14,000 | 16 | 24 |
| 180 | 3,500 | 13,000 | 8 | 24 |
| 15[d] | 1,800 | 18,000 | 5 | 16 |

[a] All of Si content was replaced by the element indicated.
[b] Cooling rate was about −60° C./min.
[c] Cooling rate was about −3° C./min.
[d] Transverse field (H') of about 1600 A/m was applied during heat-treatment

Having thus described the invention in rather full detail, it will be understood that this detail need not be strictly adhered to but that various changes and modifications may suggest themselves to one skilled in the art, all falling within the scope of the present invention as defined by the subjoined claims.

What is claimed is:

1. A ground fault interrupter comprising:
   a. first means for receiving from a current source and passing to an electrical load a current;
   b. second means for receiving from the electrical load and passing to the current source a current;
   c. detection means associated with the first and second means for detecting a ground fault current, said detection means having a core composed of a metal alloy which is at least about 90% glassy and which consists essentially of a composition having the formula $Co_aFe_bNi_cM_dB_eSi_f$ where M is at least one member selected from the group consisting of Cr, Mo, Mn and Nb, a-f are in atom percent, the sum (a+b+c+d+e+f) is equal to 100, "a" ranges from about 66 to 71, "b" ranges from about 2.5 to 4.5, "c" ranges from about 0 to 3, "d" ranges from about 0 to 2 except when M=m in which case "d" ranges from about 0 to 4, "e" ranges from about 6 to 24 and "f" ranges from about 0 to 19, with the proviso that the sum of "a", "b" and "c" ranges from about 72 to 76 and the sum of "e" and "f" ranges from about 25 to 27, said alloy having the form of a ribbon and having been heat-treated to induce therein Perminvar-like characteristics wherein said core has a constricted B-H loop having a relatively constant permeability near zero field excitation an a high permeability above a preselected threshold field; and,
   d. interruption means associated with said first means operative in response to a signal from said detection means for interrupting the passage of current.

2. A ground fault interrupter as recited in claim 1, wherein said metal alloy is at least about 97 percent glassy.

3. A ground fault interrupter as recited in claim 1, wherein said metal alloy is 100 percent glassy.

4. A ground fault interrupter core as recited in claim 1, wherein said core has impedance permeability, measured at 60 Hz, less than about 50,000 at near zero field excitation and at least abvout 12,000 above the threshold field.

5. A ground fault interrupter as recited in claim 1, wherein said glassy metal alloy has the composition $$Co_{67.8}Fe_{4.2}Cr_1B_{12}Si_{15}.$$

6. A ground fault interrupter as recited in claim 1, wherein said glassy metal alloy has the composition $$Co_{67.0}Fe_{4.0}Cr_2B_{12}Si_{15}$$

7. A ground fault interrupter as recited in claim 1, wherein said glassy metal alloy has the composition $$Co_{67.8}Fe_{4.2}Mo_1B_{12}Si_{15}$$

8. A ground fault interrupter as recited in claim 1, wherein said glassy metal alloy has the composition $$Co_{69.2}Fe_{3.8}Mo_2B_8Si_{17}$$

9. A ground fault interrupter as recited in claim 1, wherein said glassy metal alloy has the composition $$Co_{68.2}Fe_{3.8}Mn_1B_{12}Si_{15}$$

10. A ground fault interrupter as recited in claim 1, wherein said glassy metal alloy has the composition $$Co_{67.7}Fe_{3.3}Mn_2B_{12}Si_{15}$$

11. A group fault interrupter as recited in claim 1, wherein said glassy metal alloy has the composition $$Co_{68.8}Fe_{4.2}Cr_2B_{10}Si_{15}$$

12. A group fault interrupter as recited in claim 1, wherein said glassy metal alloy has the composition $$Co_{69.0}Fe_{4.0}Cr_2B_8Si_{17}$$

13. A group fault interrupter as recited in claim 1, wherein said glassy metal alloy has the composition $$Co_{70.5}Fe_{4.5}B_{15}Si_{10}$$

14. A group fault interrupter as recited in claim 1, wherein said glassy metal alloy has the composition $$Co_{69.9}Fe_{4.1}Mn_1B_8Si_{17}$$

15. A group fault interrupter as recited in claim 1, wherein said glassy metal alloy has the composition $$Co_{69.0}Fe_{4.0}Mn_2B_8Si_{17}$$

16. A group fault interrupter as recited in claim 1, wherein said glassy metal alloy has the composition $$Co_{68.0}Fe_{4.0}Mn_3B_8Si_{17}$$

17. A group fault interrupter as recited in claim 1, wherein said glassy metal alloy has the composition $$Co_{67.1}Fe_{4.9}Mn_4B_8Si_{17}$$

18. A group fault interrupter as recited in claim 1, wherein said glassy metal alloy has the composition $$Co_{67.5}Fe_{4.5}Ni_{3.0}B_8Si_{17}$$

19. A group fault interrupter as recited in claim 1, wherein said glassy metal alloy has the composition $$Co_{69.0}Fe_{3.0}Mn_3B_{10}Si_{15}$$

20. A group fault interrupter as recited in claim 1, wherein said glassy metal alloy has the composition $$Co_{68.5}Fe_{2.5}Mn_4B_{10}Si_{15}$$

* * * * *

UNITED STATES PATENT AND TRADEMARK OFFICE
CERTIFICATE OF CORRECTION

PATENT NO. : 4,956,743
DATED : September 11, 1990
INVENTOR(S) : R. Hasegawa

It is certified that error appears in the above-identified patent and that said Letters Patent is hereby corrected as shown below:

Column 9, line 39 --m-- should read "Mn".

Column 9, line 48 --an-- should read "and".

Column 9, line 61 --abvout-- should read "about".

Signed and Sealed this

Thirty-first Day of December, 1991

Attest:

HARRY F. MANBECK, JR.

*Attesting Officer*  *Commissioner of Patents and Trademarks*